(12) United States Patent
Wirz

(10) Patent No.: US 6,739,943 B2
(45) Date of Patent: May 25, 2004

(54) MACHINING THE TEETH OF DOUBLE SIDED FACE GEARS

(75) Inventor: Walter Wirz, Pfaffikon (CH)

(73) Assignee: Reishauer AG, Wallisellen (CH)

(*) Notice: Subject to any disclaimer, the term of this patent is extended or adjusted under 35 U.S.C. 154(b) by 160 days.

(21) Appl. No.: 09/985,547

(22) Filed: Nov. 5, 2001

(65) Prior Publication Data
US 2002/0077030 A1 Jun. 20, 2002

(30) Foreign Application Priority Data
Nov. 4, 2000 (DE) .......................... 100 54 795

(51) Int. Cl.⁷ .................... B24B 49/00; B24B 51/00; B24B 1/00
(52) U.S. Cl. .................... 451/5; 409/12; 409/15; 409/40; 451/47; 451/194; 451/219; 451/253
(58) Field of Search ................ 451/5, 47, 194, 451/219, 253; 409/11, 12, 13, 14, 15, 16, 28, 38, 40

(56) References Cited

U.S. PATENT DOCUMENTS

| 3,879,898 A | * | 4/1975 | Loxham et al. ............. 451/5 |
| 4,084,350 A | * | 4/1978 | Ongaro ........................ 451/5 |
| 4,765,095 A | * | 8/1988 | Wiener .......................... 451/5 |
| 4,788,476 A | * | 11/1988 | Ginier ......................... 451/5 |
| 5,662,514 A | * | 9/1997 | Masseth et al. .............. 451/5 |
| 5,857,894 A |   | 1/1999 | Griesbach et al. |
| 5,941,124 A |   | 8/1999 | Tan |
| 6,050,883 A | * | 4/2000 | Wiener ....................... 451/47 |

FOREIGN PATENT DOCUMENTS

WO        WO 98/02268        1/1998

OTHER PUBLICATIONS

Patent Abstracts of Japan, "JP 01159131 A", entitled "Automatic Meshing Device", published Jun. 22, 1989, applicant Mitsubishi Heavy Ind Ltd.

* cited by examiner

Primary Examiner—Timothy V. Eley
(74) Attorney, Agent, or Firm—Browdy and Neimark, P.L.L.C.

(57) ABSTRACT

On account of the constructional form of the tool head (17) according to the invention, the opposite sides (18, 19) of a tool (13) attached to the tool spindle (14) of a numerically controlled continuously generating gear grinding or hobbing machine are capable of machining the upper and lower sets of teeth (2, 3) of a double-sided face-gear (1) in one and the same set-up and without disturbing the synchronization between the rotations of the grinding worm and workpiece maintained during the grinding of the first set of teeth, without risk of collision. This eliminates the need to reset the workpiece (1) between the machining of the two sets of teeth (2, 3), thereby shortening the overall machining time substantially, and allowing the avoidance of accuracy losses due to the resetting of the workpiece (1).

6 Claims, 3 Drawing Sheets

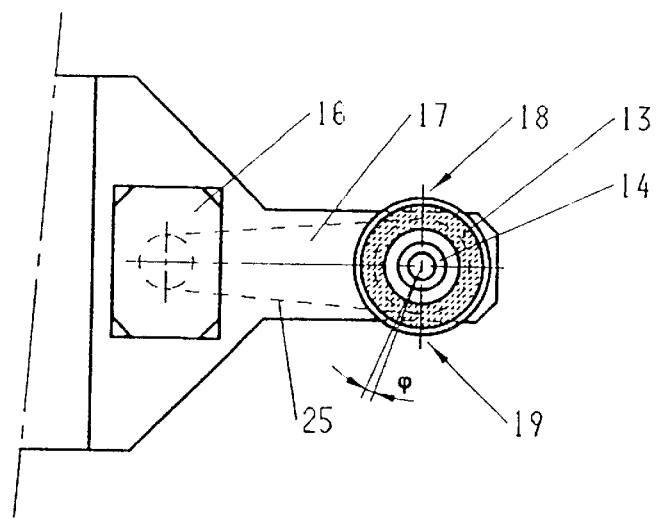
Fig. 3
Fig. 4
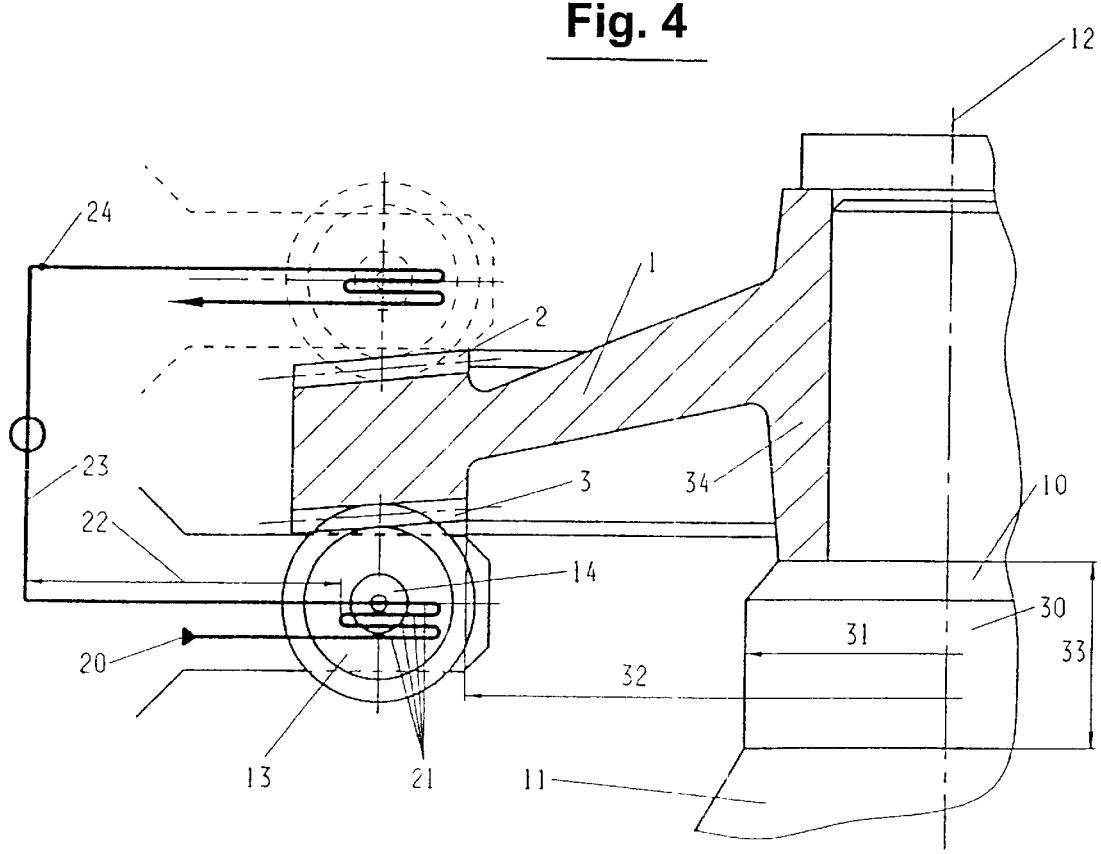

MACHINING THE TEETH OF DOUBLE SIDED FACE GEARS

BACKGROUND OF THE INVENTION

1. Technical Field of the Invention

The invention concerns a process and a device for the grinding or hobbing of the teeth of face-gears.

2. Prior Art

Thanks to the modern NC technology on present day machine tools, it has become possible to machine the teeth of crown-gears or face-gears to maximum precision by the continuous generating process. The decisive step to this end was the solving of the task of making the required geometrically very intricate worm-shaped tool to the necessary degree of accuracy.

High precision face-gears afford advantages in helicopter gears, amongst other things, because angular drive designs are then possible which would be impossible or at least far more difficult to construct with bevel gears. There are gear designs in existence, for example, which in spite of high transmitted power are of compact dimensions and light in weight, thanks to torque splitting. Torque splitting means that in the course of transmission to an output shaft the input torque is divided up and applied to the same driven gear via two or more tooth engagements. For a specified power, this measure allows the driven gear to be made smaller, and hence lighter.

OBJECT AND SUMMARY OF THE INVENTION

An advantageous design for such a gear stage with torque splitting requires a driven face-gear which has two opposite sets of teeth on its periphery. Engaging with each of these sets of teeth is a pinion which transmits half of the total torque. It is of particular importance for the optimum exploitation of torque splitting that the division of the torque is very exact. With respect to their angular position about the axis of rotation, therefore, the two sets of face-gear teeth must be aligned very accurately one to the other.

The manufacture of such double-sided face-gears has as yet been very complicated, and must be performed in two operations:

1. Machining of the first set of teeth; then removal, reversal and renewed setting up of the workpiece.
2. Exact alignment of the already machined set of teeth relative to the machining tool, such that the second set of teeth is machined at the specified position relative to the first set; then machining of the second set of teeth.

This process is time consuming, and embodies the risk of accuracy loss.

It is an object of the invention to introduce a process and a device which considerably facilitate the manufacture of such double-sided face-gears, and which assure a higher attainable accuracy. This task is achieved by way of a process for the continuous grinding or hobbing of the teeth of a double-sided face-gear having a first and a second set of teeth on a numerically controlled face-gear grinding or hobbing machine, the machine comprising NC machine axes X, Y and Z and a grinding or hobbing tool, the process comprising the steps of machining said first set of teeth (3), wherein said face-gear and said grinding or hobbing tool are rotated in a synchronized manner relative to each other during the machining, moving and aligning said grinding or hobbing tool by means of said NC machine axes X, Y and Z with respect to its angular position and its location relative to said double-sided face-gear in a position required for machining said second set of teeth, wherein said movement and alignment is made without interrupting said synchronization between the rotations of said grinding or hobbing tool and said face-gear, and machining said second set of teeth This task is furthermore achieved by a device for the continuous generating grinding or hobbing of teeth of a double-sided face-gear having a first and a second set of teeth on a numerically controlled continuous generating gear grinding or hobbing machine, the device comprising a work spindle defining a workpiece axis, a work fixture for setting up said face-gear on said work spindle, a tool head movable relative to said face-gear via NC-axes X, Y and Z of the grinding or hobbing machine, the tool head comprising a tool spindle and a worm-shaped tool attached to said tool spindle and located in bearings in said tool head, the tool having on its circumference a first and a second zone, wherein the second zone is located opposite the first zone, wherein the rotations of said face-gear and said worm-shaped tool being synchronized one to the other according to a total number of teeth of said first set of teeth and a total number of thread starts on said worm tool, wherein due to the constructional form of said tool head, both said first zone and said second zone of said tool can alternatively be brought into machining engagement with said first set of teeth and the second set of teeth of said face-gear, without collision between the latter and said tool head.

The invention is explained in the following by the example of grinding the two sets of teeth of a double-sided face-gear on a numerically controlled continuous generating face-gear grinding machine. It is however equally applicable in the same sense to a numerically controlled face-gear hobbing machine.

According to the invention the process consists in the use of an especially designed tool head that allows the worm-shaped tool to be engaged on two opposite sides to machine the two sets of teeth of a double-sided face-gear in one and the same set-up, without disturbing the synchronization maintained between the grinding worm rotation and workpiece rotation while grinding the first set of teeth.

A number of advantages are thereby gained simultaneously:

1. The removal and resetting of the workpiece to grind the second set of teeth are dispensed with, which shortens the overall machining time substantially.
2. The workpiece and work fixture need therefore only be designed for one set-up configuration.
3. The two machined sets of teeth run very exactly concentric and in angular definition to each other, which results in an improved quality in load distribution.
4. The mutual rotational alignment of the sets of teeth can be effected very easily and to high precision via the control system, which likewise contributes to an increase in the overall gearing quality.

A further special advantage of the process according to the invention is that it is possible to grind topologically corrected double-sided face-gears, where the topology is produced by modifications to the tool flank profile, one after the other without having to re-profile or exchange the tool between the two operations. This is due to the fact that during machining, the working and non-working flanks of both sets of teeth make contact with the same portions of the tool, whereas in the conventional method with resetting of the workpiece between the machining of the first and second sets of teeth the allocation of the tool flanks to the workpiece flanks alters.

BRIEF DESCRIPTION OF THE DRAWINGS

A constructional example of the invention is illustrated with reference to the FIGS. 1 to 4. These depict:

FIG. 3 the device according to the invention, for grinding double-sided face-gears in one and the same set-up, FIG. 4 diagrammatically the grinding process according to the invention, and FIG. 5 a perspective of a sector of the teeth of the face-gear.

DETAILED DESCRIPTION OF THE PREFERRED EMBODIMENT(S) OF THE INVENTION

Figure 1:
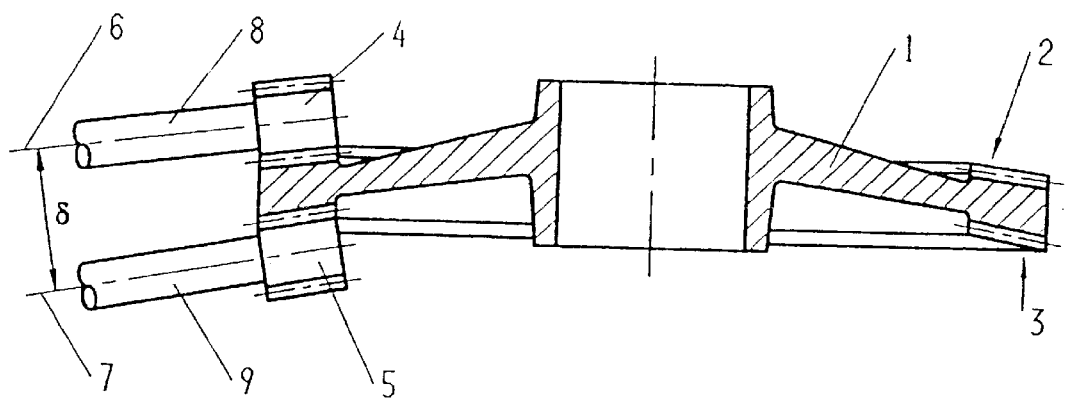
FIG. 1 the axial cross-section through a double-sided face-gear.

FIG. 1 shows diagrammatically the cross-section of a double-sided crown-gear or face-gear 1 such as is used for example in helicopter gears. The driving torque is transmitted in part to each of the two sets of teeth 2, 3 by the separate driving pinions 4, 5. The axes 6, 7 of the pinion shafts 8, 9 can be parallel or set at a mutual angle of inclination δ. In the second case at least one of the sets of face-gear teeth 2, 3 is concave or convex.

The above mentioned exact tangential alignment of the face-gear teeth 2, 3 one to the other can be such that the tooth space centre of both sets of teeth lie in on a defined radius in the same plane through the face-gear axis, or on the other hand mutually offset by the offset angle ε.

Figure 2:
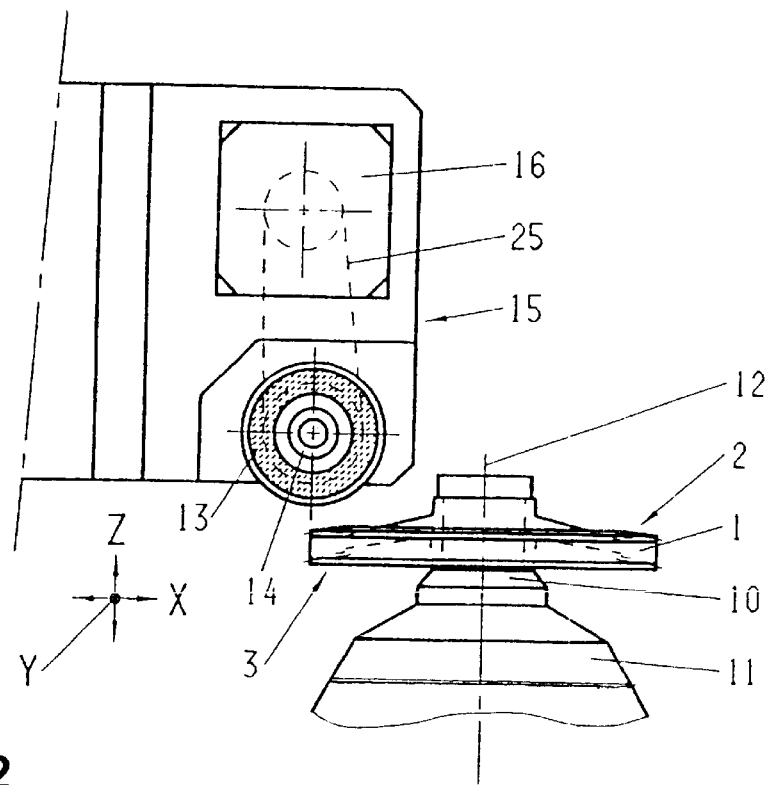
FIG. 2 the working area of a conventional face-gear grinding machine.
Figure 5:
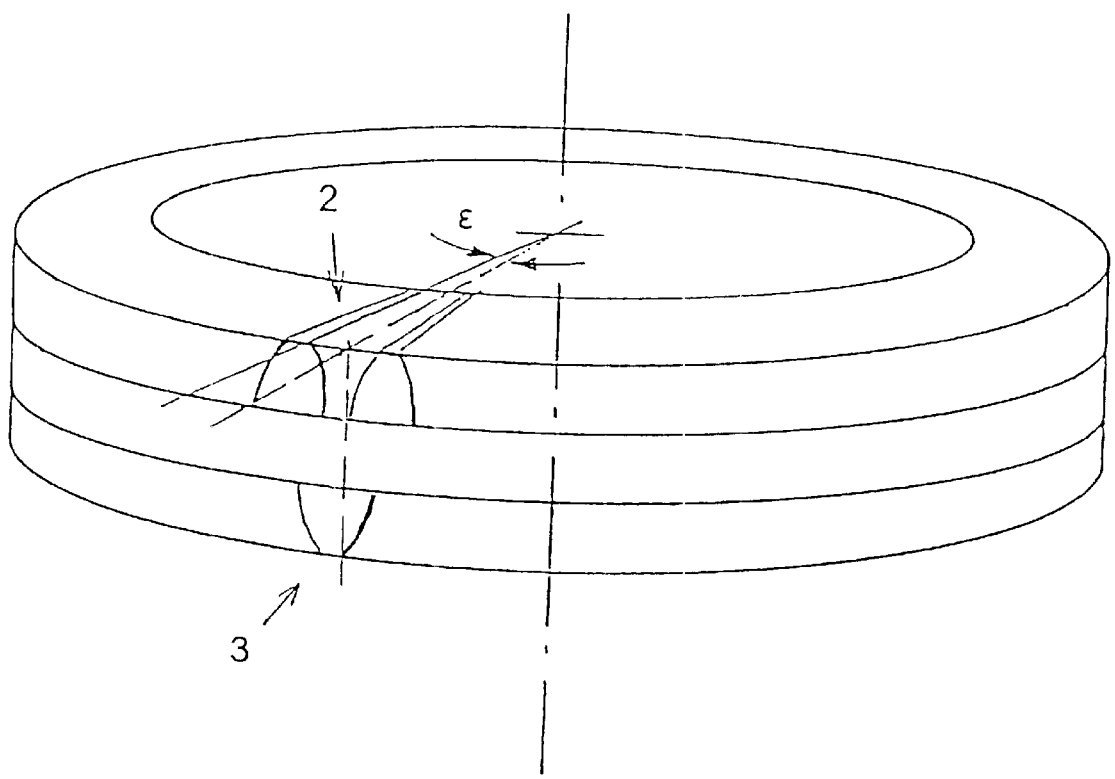

FIG. 2 shows the working area of a conventional NC-controlled continuously generating face-gear grinding machine. The face-gear 1 to be machined is set up by means of a suitable work fixture 10 on the work spindle 11. During machining it rotates about its axis 12. The grinding worm 13 is attached to the grinding spindle 14, which is located for rotation in the grinding head 15, and driven by the grinding motor 16 via a means 25 here only symbolically indicated. During the machining of the face-gear teeth 2, the workpiece 1 and grinding worm 13 rotate in mutual synchronization according to the ratio between the number of thread starts on the grinding worm and the number of teeth on the crown-wheel, whilst the grinding head 15—and hence also the grinding worm 13—are moved along the imaginary pinion axis 6, controlled by the NC axes X, Y and Z. After inverting the workpiece 1, the set of teeth 3 are machine in the same manner, the grinding worm 13 being moved along the imaginary pinion axis 7.

FIG. 3 depicts the device according to the invention for the grinding of double-sided face-gears in a single set-up. The grinding worm 13 is attached to the grinding spindle 14, which is located for rotation in the grinding head 17. Here the grinding head 17 is so designed and the driving motor 16 so arranged that the grinding worm 13 can engage with either of the two sets of face-gear teeth 2, 3 with two of its sides 18, 19 without colliding with the workpiece 1. The grinding head 17 projects in the direction X radial to the workpiece axis 12, and the bearings and driving components of the grinding spindle 14 are either narrower than the diameter of the grinding worm 13 in the Z-direction, or offset axially relative to the grinding worm 13 such that they cannot collide with the workpiece 1 and with the work spindle 11 either during the machining of the set of teeth 2 or during the machining of the set of teeth 3. To this purpose in the second case the bearings and driving components of the spindle 14 are offset in the axial direction of this spindle at least half the outside diameter of the workpiece 1 relative to the axial midpoint of the worm 13. Moreover the work fixture 10 has an axial extension 30, of which the outside diameter 31 is less than the difference between the inside diameter 32 of the set of teeth 3 and the outside diameter of the grinding worm 13. The axial length 33 of the extension 30 corresponds roughly to the difference between the diameter of the grinding worm 13 and the length of that part of the workpiece hub 34 projecting beyond the set of teeth 3 of the workpiece 1.

FIG. 4 depicts diagrammatically the process according to the invention for grinding the two sets of face-gear teeth 2, 3 of the face-gear 1 in a single set-up. In the example illustrated here the set of teeth 3 is machined first. Commencement could just as well be made by grinding the set of teeth 2. The starting point for the motion of the grinding worm 13 in the machine cycle is the position 20. The grinding worm is firstly moved in the known manner backwards and forwards on the paths 21 along the imaginary pinion axis 7 across the teeth 3 to be ground, and infed incrementally according to the machining allowance on the pre-machined face-gear teeth. On reaching the finished dimension of the set of teeth 3, the grinding worm 13 is retracted a distance 22 without disturbing the synchronization between tool and workpiece necessary for grinding, which distance 22 permits a subsequent non-colliding shift 23 to the starting position 24 for the grinding of the set of teeth 2.

Prior to the grinding procedure on the set of teeth 2, the grinding worm 13, which is still rotating synchronous with the workpiece, is shifted by a relative tool rotation angle of φ. The magnitude of this angle depends on the number of teeth on the face-gear, the number of thread starts on the grinding worm, the desired angle of offset ε between the two sets of face-gear teeth 2, 3 and the angle of inclination δ of the two sets of teeth relative to each other; i.e. the deviation out of parallel of the imaginary pinion axes 6 and 7.

The angular amount φ is $$\varphi = \frac{\varepsilon \cdot z}{g} - \frac{360}{2 \cdot g} \pm \delta$$

where:

φ=Tool rotational shift in degrees;

ε=Angular offset between a reference tooth spaces of said two sets of face-gear teeth in degrees;

g=Number of thread starts on the grinding or hobbing tool;

z=Number of teeth on said face-gear, and

δ=Deviation off parallel between pinion axes of said first and second set of teeth in degrees.

The rotation of the grinding worm 13 through the tool rotary shift angle φ is effected to high precision via the NC control system, which calculates the exact angular magnitude with reference to the above stated input parameters. After rotating the grinding worm 13 through the tool rotary shift angle φ, the worm is once again moved in the manner described for the set of teeth 3 parallel to the imaginary pinion axis 6 to and from across the set of teeth 2, and infed according to the desired material removal rate until the finished dimension is attained. After the retraction of the grinding worm to the starting position the machining of the two sets of teeth 2, 3 has been terminated.

What is claimed is:

1. A process for the continuous grinding or hobbing of the teeth of a double-sided face-gear having a first and a second set of teeth on a numerically controlled face-gear grinding or hobbing machine, the machine having NC machine axes X, Y and Z and a grinding or hobbing tool, the process comprising the steps of;

machining said first set of teeth (3), wherein said face-gear and said grinding or hobbing tool are rotated in a synchronized manner relative to each other during the machining, moving and aligning said grinding or hobbing tool by means of said NC machine axes X, Y and Z with respect to an angular position of the tool and a location of the tool relative to said double-sided face-gear in a position required for machining said second set of teeth, wherein said movement and alignment is made without interrupting said synchronization between the rotation of said grinding or hobbing tool and said face-gear, and machining said second set of teeth.

2. The process according to claim 1, further comprising the step of;

rotating said grinding or hobbing tool after machining said first set of teeth for purpose of rotational alignment thereof with the angular position of said second set of teeth, wherein said grinding or hobbing tool is rotated through an angular amount $$\varphi = \frac{\varepsilon \cdot z}{g} - \frac{360}{2 \cdot g} \pm \delta$$

relative to a theoretically desired position of said grinding or hobbing tool, this position being defined by said synchronization with the face-gear rotation for machining said first set of teeth, where:

φ=Tool rotational shift in degrees
    ε=Angular offset between reference tooth spaces of said two sets of face-gear teeth in degrees
    g=Number of thread starts on the grinding or hobbing tool
    z=Number of teeth on said face-gear
    δ=Deviation off parallel between pinion axes of said first and second set of teeth in degrees.

3. A device for the continuous generating grinding or hobbing of teeth of a double-sided face-gear having a first and a second set of teeth on a numerically controlled continuous generating gear grinding or hobbing machine, the device comprising a work spindle defining a workpiece axis, a work fixture for setting up said face-gear on said work spindle, a tool head movable relative to said face-gear via NC-axes X, Y and Z of the grinding or hobbing machine, the tool head comprising a tool spindle and a worm-shaped tool attached to said tool spindle and located in bearings in said tool head, the tool having on its circumference a first and a second zone, wherein the second zone is located opposite the first zone, wherein the rotations of said face-gear and said worm-shaped tool being synchronized one to the other according to a total number of teeth of said first set of teeth and a total number of thread starts on said worm-shaped tool, wherein due to the constructional form of said tool head, both said first zone and said second zone of said tool can alternatively be brought into machining engagement with said first set of teeth and the second set of teeth of said face-gear, without collision between the latter and said tool head.

4. The device according to claim 3, wherein said tool has an outer diameter and wherein said tool head is narrower, measured in a direction of said workpiece axis, than said outer diameter of said tool.

5. The device according to claim 3, wherein said face-gear has an outer diameter, wherein the tool spindle comprises bearings and driving components arranged on said tool head and wherein said bearings and driving components are offset relative to an axial midpoint of said worm tool by an amount at least half said outside diameter of said face-gear in the direction of said tool spindle axis.

6. The device according to claim 3, wherein said work fixture is provided with an extension in the direction of said work spindle axis, said extension comprising an outside diameter being less than the difference between an inside diameter of said first and second sets of teeth and an outside diameter of said worm tool.

* * * * *